US012782220B2

(12) United States Patent
Hagström et al.

(10) Patent No.: US 12,782,220 B2
(45) Date of Patent: Nov. 3, 2026

(54) MEASUREMENT PROBE FOR MEASURING PRESSURE INSIDE AIR DUCT AND MEASUREMENT SYSTEM FOR MEASURING PRESSURE DIFFERENCE

(71) Applicant: Halton Oy, Kausala (FI)

(72) Inventors: Kim Hagström, Kausala (FI); Vili Kohtaniemi, Kausala (FI); Pekka Kanerva, Kausala (FI); Raimo Parkkila, Kausala (FI); Harri Purho, Kausala (FI)

(73) Assignee: HALTON OY, Kausala (FI)

( * ) Notice: Subject to any disclaimer, the term of this patent is extended or adjusted under 35 U.S.C. 154(b) by 241 days.

(21) Appl. No.: 18/536,782

(22) Filed: Dec. 12, 2023

(65) Prior Publication Data

US 2024/0201037 A1 Jun. 20, 2024

(30) Foreign Application Priority Data

Dec. 15, 2022 (EP) .................................... 22213816

(51) Int. Cl.
*G01L 13/00* (2006.01)

(52) U.S. Cl.
CPC .................................... *G01L 13/00* (2013.01)

(58) Field of Classification Search
CPC ........ F24F 11/74; G01N 1/2247; G01L 19/00; G01L 11/00; G01L 19/142; G01L 13/00
See application file for complete search history.

(56) References Cited

U.S. PATENT DOCUMENTS

| | | | | |
|---|---|---|---|---|
| 4,251,027 | A | 2/1981 | Dehart et al. | |
| 2017/0045255 | A1* | 2/2017 | Karamanos | G05B 17/02 |
| 2021/0190657 | A1* | 6/2021 | Greist | G01N 7/10 |
| 2022/0221380 | A1* | 7/2022 | Moeller | G01N 1/2247 |
| 2024/0068850 | A1* | 2/2024 | Fentzlaff | G01F 1/46 |

FOREIGN PATENT DOCUMENTS

JP 2012247121 A 12/2012

OTHER PUBLICATIONS

Extended European Search Report mailed May 12, 2023 for corresponding EP patent application No. 22213816.6 (8 pages).

* cited by examiner

*Primary Examiner* — Thomas M Hammond, III
(74) *Attorney, Agent, or Firm* — Carroll, Hoette & Butscher, LLC; Christopher R. Carroll

(57) ABSTRACT

A measurement probe for measuring air pressure inside an air duct, which measurement probe is arranged to be installed to a wall of a damper having at least one damper blade or to a wall of an air duct in which the damper is installed, wherein the measurement probe comprises:
- a top surface and a bottom surface, and
- a measurement point comprising a hole extending from the top surface to the bottom surface, which hole is arranged to be connected to an air channel and further to a pressure sensor. The measurement probe comprises a wall next to the hole, wherein the wall extends from the top surface.

15 Claims, 3 Drawing Sheets

MEASUREMENT PROBE FOR MEASURING PRESSURE INSIDE AIR DUCT AND MEASUREMENT SYSTEM FOR MEASURING PRESSURE DIFFERENCE

CROSS-REFERENCE TO RELATED APPLICATIONS

This application claims priority to European Patent Application No. 22213816.6 (filed 15 Dec. 2022), the entire disclosure of which is incorporated herein by reference.

TECHNICAL FIELD

The present invention relates to measurement probes for measuring air pressure inside an air duct.

BACKGROUND OF THE ART

In ventilation units, supply air is introduced into a space, such as a room of a building, and exhaust air is removed from the space. The needed amount and volume of supply air varies and is dependent on the conditions in the space, e.g. number of people in the room, temperature of the room etc. For controlling the supply air volume, a damper or dampers may be arranged inside the air ducts. The damper may comprise, for example a blade or blades which are rotatable about an axis perpendicular to the air flow direction in the duct. The damper may be adjusted between closed position, i.e. damper blade is rotated in perpendicular position to the air flow direction, wherein the damper is blocking the air flow inside the duct, and fully open position, i.e. the damper blade is rotated in parallel position to the air flow direction. As known, position of the damper blade affects to the velocity of the air flow.

Typically, a building has a central ventilation system for supplying air into the rooms and exhaust air from the rooms. Each room comprise at least one supply air inlet and an adjusting means, such as a damper, for controlling the supply air volume diffused into the room. If one damper is adjusted to reduce the air flow volume into one room, the pressure inside the air duct increases and velocity of the air flows into the other rooms increase, which may lead to temperature drop in the other rooms. To prevent this effect, the ventilation units may comprise sensors arranged near the dampers within the air duct to measure air flow properties inside the duct. One solution is to use pressure sensors to measure air pressure inside the duct. However, traditional units have challenge to measure and control low air flow velocity due to insufficient measurement pressure. Also, traditional air pressure measurement units in the air ducts struggle to measure the pressure when there are disturbances in the air flow, e.g. after a turn of the ducting. Thus, the known sensors need some safety distance after the flow disturbances (e.g. a turn), which means that the known systems, i.e. the damper with air pressure sensors needs a lot of space.

Objective of the Invention

The objective of the device/method is to alleviate the disadvantages mentioned above.

In particular, it is an objective of the present device to provide a measurement probe capable to provide enhanced air pressure data at proximity of air flow disturbances such as duct turn, t-joint or an air damper in various environments.

SUMMARY

According to a first aspect, the present invention provides a measurement probe for measuring air pressure inside an air duct, which measurement probe is arranged to be installed to a wall of an air duct or to a wall of a damper having at least one damper blade, which damper is installed to an air duct, wherein the measurement probe comprises a top surface and a bottom surface, and a measurement point comprising a hole extending from the top surface to the bottom surface. The hole is arranged to be connected to an air channel and further to a pressure sensor. The measurement probe comprises a wall next to the hole, wherein the wall extending is from the top surface.

The advantage of the device is that the pressure difference measurement is enhanced, and the pressure measurement is better protected from flow disturbances. Depending on the position of the wall, in relation to the hole and direction, airflow different pressure characteristics may be more reliably measured.

In an embodiment of the device, the wall is extending in parallel direction to the hole.

In an embodiment of the device, the wall is curved around the hole, and the curved wall has radius R.

In an embodiment of the device, the radius R is 4 to 10 mm.

In an embodiment of the device, the curved wall has a central angle of 45 to 270 degrees.

In an embodiment of the device, the curved wall has a central angle of 180 degrees.

In an embodiment of the device, the height of the wall is 3 to 15 mm from the top surface.

In an embodiment of the device, the height of the wall is 5 to 10 mm from the top surface.

In an embodiment of the device, the measurement probe comprises:

- a flange part having a perimeter, and
- an elongated part having a first end and a second end,
- wherein the flange part is positioned at the first end of the elongated part.

In an embodiment of the device, the shape of the perimeter is circular or hexagonal.

In an embodiment of the device, the wall comprises an inner surface facing the hole, and an outer surface facing in opposite direction to the inner surface.

In an embodiment of the device, the shape of the outer surface corresponds at least partially to the shape of the perimeter of the flange.

In an embodiment of the device, the flange part has a greater diameter than the elongated part.

In an embodiment of the device, the flange part comprises the top surface, and the bottom surface is at the second end of the elongated part.

In an embodiment of the device, the measurement probe is arranged to be fastened to the damper wall or to the air duct wall so that the flange part is inside the damper or the duct.

In an embodiment of the device, the hole has a diameter of 1 to 3 mm.

Another aspect of the invention is to provide an air pressure measurement system for measuring pressure difference on different sides of an air damper having at least one damper blade, wherein the system comprises at least two measurement probes according to any one of the preceding claims arranged to be fastened on different sides of the air damper so that the wall of each measurement probe is between the measurement point and the damper blade or damper blades.

It is to be understood that the aspects and embodiments of the invention described above may be used in any combination with each other. Several of the aspects and embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

A measurement probe for measuring air pressure is a device which may be used to measure air pressure inside an air duct. The measured data may be used for example to define actual pressure and/or pressure difference on different sides of a damper within the air duct. The pressure difference may be used to define or calculate the air flow amount that goes through the damper and further to adjust the ventilation.

The measurement probe is a component of an air flow control unit is an apparatus which is arranged to be installed into a duct, in which air or other fluid is flowing. The air flow control unit may restrict air flow in a duct, and it is used for controlling air flow into a space, such as a room of a building. The duct, namely the cross-sectional shape of the duct, may be round, rectangular or any other shape. The air flow control unit comprises a damper, which is used for controlling the air flow through the air control unit. The damper has at least one damper blade, which may rotate around an axis, which is perpendicular to the air flow direction, between closed position and open position. In closed position, the damper blade blocks the air flow in the duct, and in open position, the damper blade is rotated to a position, wherein it least restricts the air flow.

The measurement probe is arranged to be installed to a damper wall or a duct wall (top, bottom and/or side wall) so that the air pressure near or within the damper may be measured.

Figure 1:
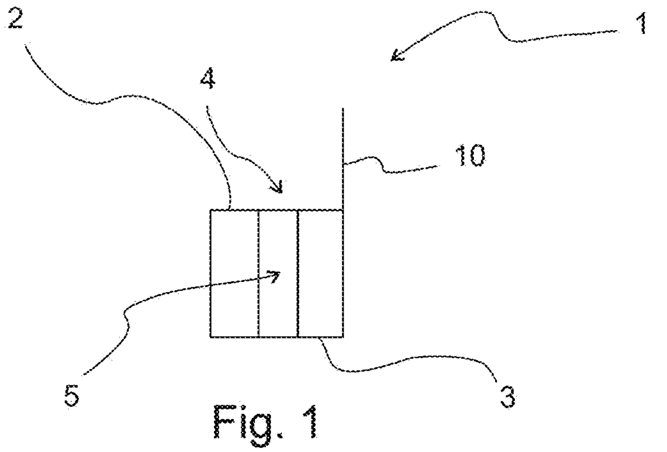
FIG. 1 shows an air control unit for controlling air flow in duct.

FIG. 1 shows a measurement probe 1 comprising a wall 10. The measurement probe 1 may be connected to an air duct or channel, which is further connected to a sensor for measuring the pressure. The measurement probe comprises a top surface 2, which is exposed to the duct when the measurement probe is installed, and a bottom surface 3, which is outside of the inner surface of the damper or duct when the measurement probe is installed. The measurement probe comprises a measurement point 4, which is an area where the air pressure is measured. The measurement point 4 comprises a hole 5 which extends from the top surface 2 to the bottom surface 3. When in use, the measurement probe, namely the hole, is connected to an air channel and further to a pressure sensor for measuring the air pressure. The measurement probe comprises a wall 10 next to the hole 5 for minimizing the disturbances in the air flow. The wall 10 is extending from the top surface 2 of the measurement probe.

The wall 10 may be extending in parallel direction to the hole 5, i.e. the wall and the central axis of the hole are parallel to each other. Optionally, the wall 10 is inclined towards the hole or outwards of the hole.

Figure 2:
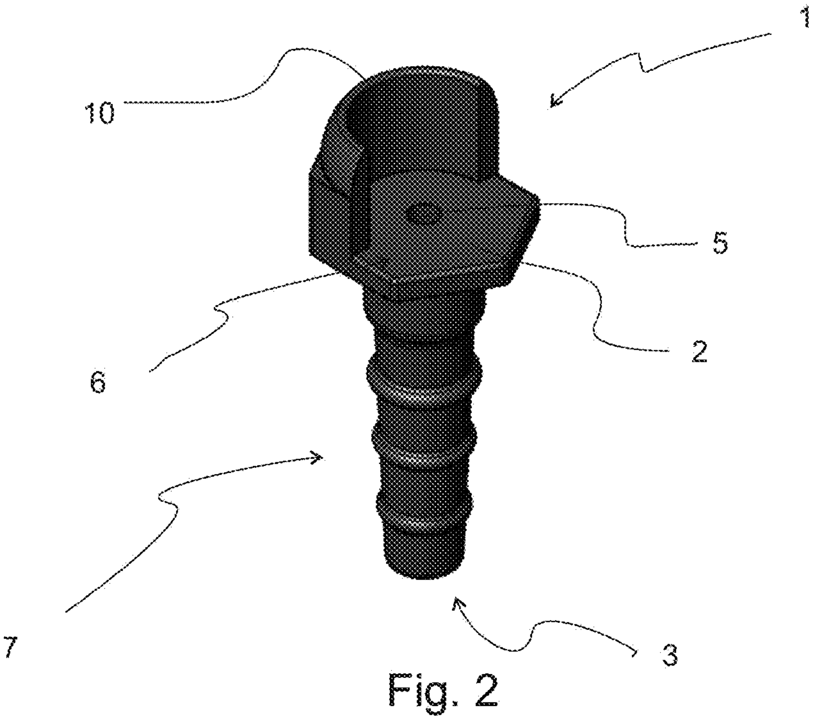
FIG. 2 shows a three-dimensional view of a measurement probe.
Figure 3:
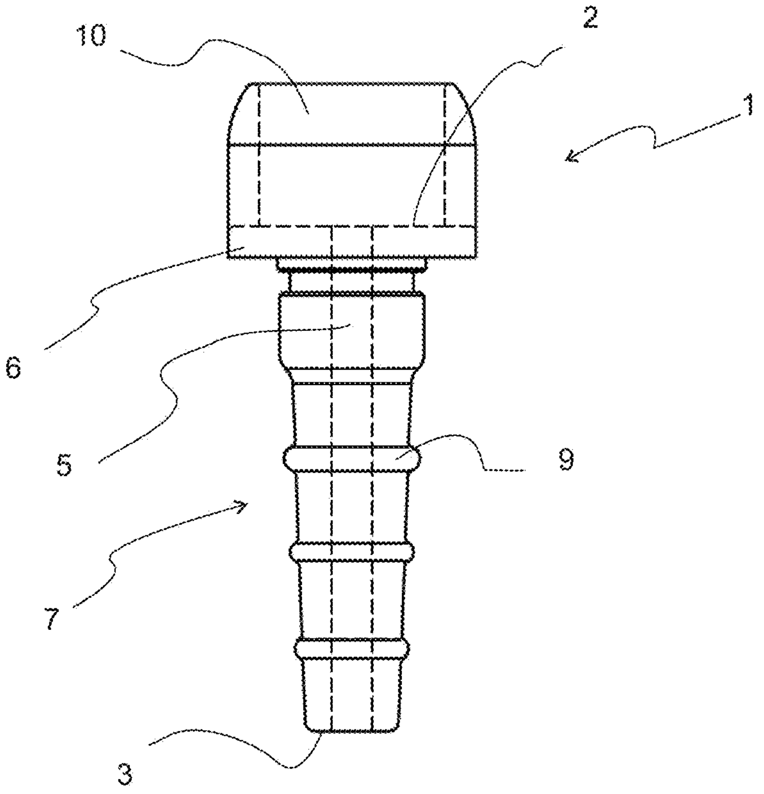
FIGS. 3 and 4 show different side views of the measurement probe as seen for example in FIG. 2, and FIGS. 5 and 6 show a measurement probe viewed from above.
Figure 4:
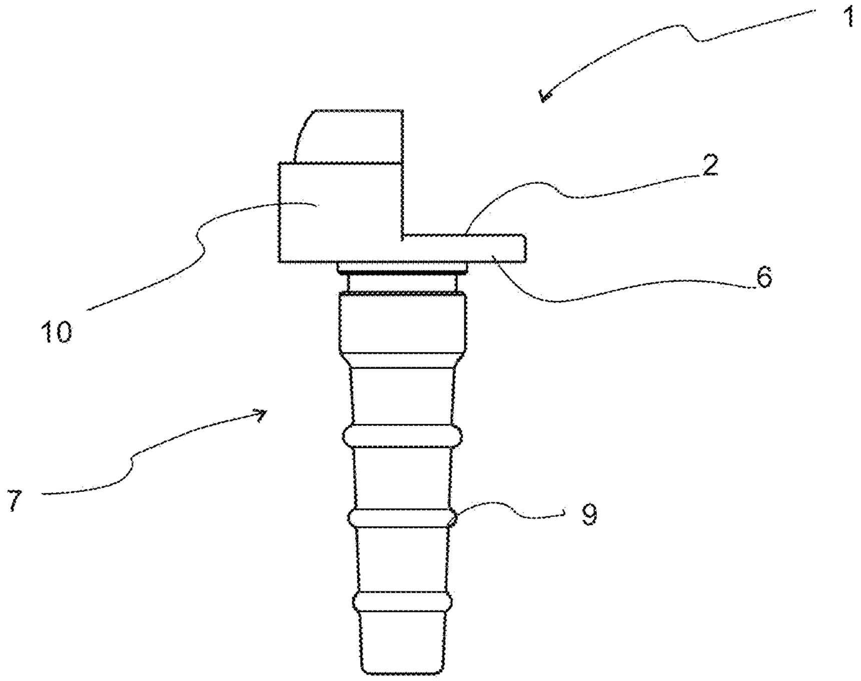

FIG. 2 shows a three-dimensional view of a measurement probe and FIGS. 3 and 4 show different side views of the measurement probe as seen for example in FIG. 2. The measurement probe 1 comprises a wall 10, a flange part 6 and an elongated part 7. The flange part 6 is positioned at first end of the elongated part 7, and the flange part 6 comprises the top surface 2. The bottom surface 3 is at second end of the elongated part 7. The wall 10 is extending from the top surface 2 in opposite direction to the elongated part 7. The hole 5 goes through the flange part 6 and the elongated part 7, i.e. from top surface to the bottom surface.

The flange part 6 has a perimeter that defines the shape of the flange part. The shape of the perimeter may be circular, hexagonal (as in FIG. 2), or angular (e.g. rectangular, octagonal etc.).

The wall 10 has an inner surface, facing towards the hole 5, and an outer surface, facing in opposite direction to the inner surface. The wall 10 may be positioned so that it extends from the perimeter of the flange part 6. The outer surface may have at least partially the same shape as the section of the perimeter of the flange part 6. Optionally the outer surface has a varying shape, e.g. extends as the shape of the perimeter of the flange part and the shape of the wall changes at some point. The changed shape may be, for example rounded so that the outer surface curves towards the hole 5. The inner surface of the wall 10 may be curved around the hole 5.

The elongated part 7 may have a profile that is cylindrical. Optionally, the profile is tapered towards the bottom surface 3. The outer surface area of the elongated part may comprise annular ridges 9.

The hole 5 has a diameter that may be 1 to 5 mm, 1 to 3 mm, or 1.5 to 2.5 mm.

Figure 5:
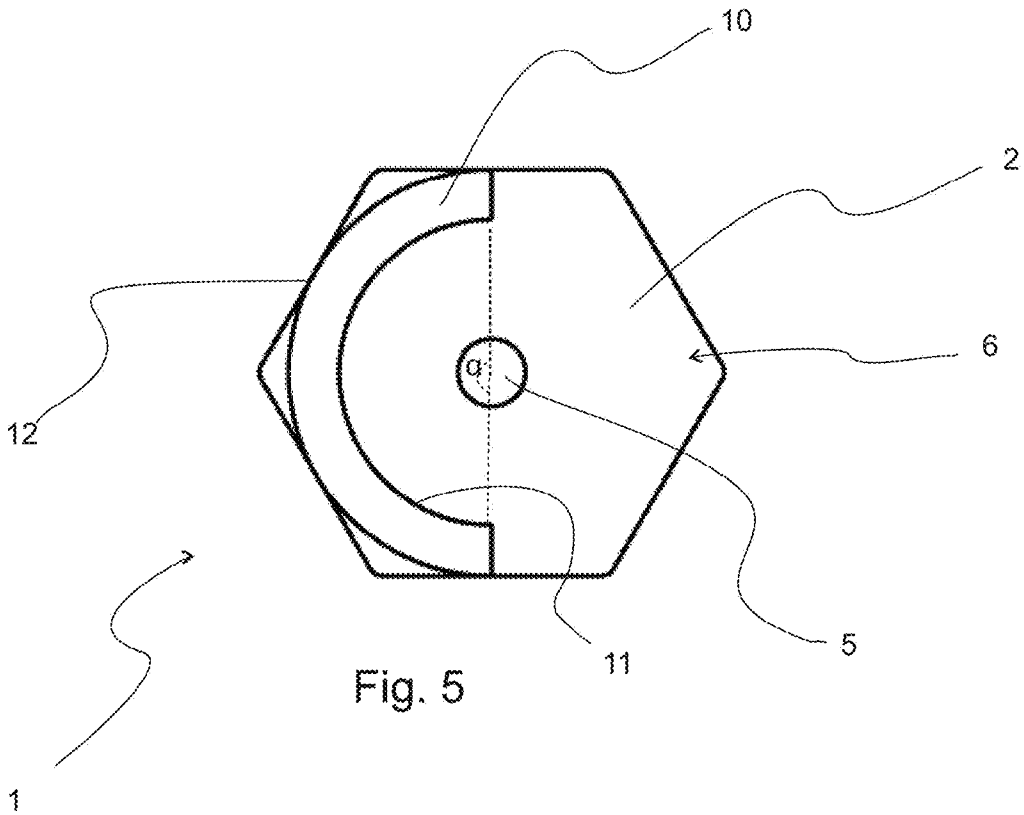
Figure 6:
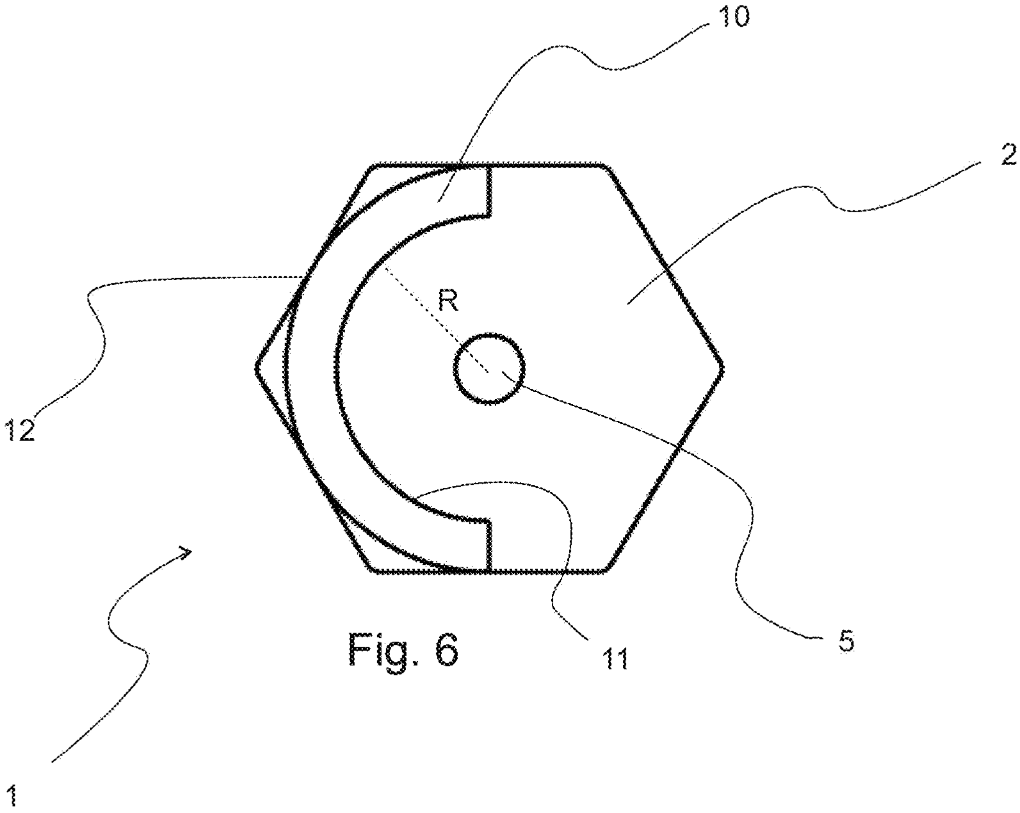

FIGS. 5 and 6 show a measurement probe viewed from above. In these figures, the perimeter of the flange part 6 has hexagonal shape. However, as previously mentioned, the shape of the perimeter may be other. The wall 10 is curved around the hole 5 so that the inner surface 11 of the wall 10 is at a distance, i.e. the curved wall has radius R, from the hole 5. The radius R may be 2, 4, 6, 8 or 10 mm. Optionally, the radius R is 2 to 10 mm, 2 to 8 mm, 4 to 10, or 4 to 8 mm.

The wall 10 extending from the top surface 2 may be curved around the hole 5 so that it has a central angle $\alpha$. The central angle $\alpha$ may be for example 45 to 270 degrees, 90 to 225 degrees, or 90 to 180 degrees. Optionally, the central angle is 90, 135, or 180 degrees.

The outer surface 12 of the wall 10 may have a shape that correspond the shape of the perimeter of the flange part 6. Optionally, the shape of the outer surface differs from the shape of the perimeter of the flange part 6. Optionally, the shape of the outer surface 12 correspond the shape of the perimeter of the flange part 6 partially, e.g. shape of a lower part (closer to the flange part 6) corresponds the shape of the perimeter of the flange part, and the shape of an upper part of the outer surface is different. The upper part may be, for example curved towards the hole 5.

The height of the wall measured from the top surface 2 may be 3 to 15 mm, 5 to 15 mm, or 5 to 10 mm.

The flange part 6 has a greater diameter than the diameter of the elongated part 7. The diameter of the flange part 6 may be 7 to 20 mm, 10 to 20 mm, or 10 to 15 mm.

The measurement probe 1 is arranged to be fastened to a damper wall or to an air duct wall so that the flange part 10 is inside the damper or duct, depending to where the measurement is fastened. The elongated part 7 goes through the wall of the damper or the air duct. Thus, the measurement probe is arranged so that hole 5 may connect the space inside the duct to a sensor for measuring the pressure and/or pressure difference inside the air duct.

The measurement probe as described herein may be part of an air pressure measurement system for measuring pressure difference on different sides of an air damper, which is arranged within an air duct. The damper comprises at least one damper blade for adjusting the air flow volume through the damper. The system may comprise two or more measurement probes so that at least one is arranged on each side of the damper, i.e. on the inlet side and on the outlet side. The measurement probes are fastened so that the wall of the measurement probe is between the measurement point and the damper blade(s).

The measurement probe(s) may be connected to a measurement sensor or sensors located at a distance from the measurement probes. Each measurement probe may be connected to one measurement sensor), or two or more measurement probes may be connected to same measurement sensor. For example, measurement probe or probes on inlet side of the damper may be connected to a first measurement sensor and the measurement probe or probes on the outlet side of the damper may be connected to the same first measurement sensor. The measurement probe may be connected to the measurement sensor by an air channel. The sensor may be for example a pressure transducer.

The measurement probe(s) may be further connected to a controller. The controller is configured to receive pressure measurement data calculate pressure difference between the inlet side and the outlet side of the damper. The controller may be connected to the damper blade so that the position data of the damper blade position may be received. The controller may be connected to the damper blade directly or via motor controlling the damper blade. The controller may be connected to the motor controlling at least one damper blade for adjusting the position of the damper based on the pressure difference. The controller may be configured to calculate the air flow amount through the damper based on pressure difference and damper position and/or to adjust ventilation based on calculated air flow amount and given set point. The given set point may be for example certain amount of air which is needed to diffuse to a space. The controller may be connected to the sensor or sensors of the measurement unit for receiving the pressure data, i.e. pressure difference.

For calculating the air flow volume, different K-factors may be stored to the controller. For example, each damper blade opening angle may have own K-factor stored for calculating the air flow. Thus, the air flow control unit may use variable K-factor depending on the damper blade opening angle.

It should be noted that the figures are not drawn in scale and are only for illustrative purposes. For example, walls at measurement areas and measurement probe sizes are exaggerated to illustrate their locations and details more clearly.

Although the invention has been the described in conjunction with a certain type of device, it should be understood that the invention is not limited to any certain type of device. While the present inventions have been described in connection with a number of exemplary embodiments, and implementations, the present inventions are not so limited, but rather cover various modifications, and equivalent arrangements, which fall within the purview of prospective claims.

The invention claimed is:

1. A measurement probe for measuring air pressure inside an air duct, the measurement probe arranged to be installed to a wall of the air duct or to a wall of a damper having at least one damper blade, the damper installed to the air duct, wherein the measurement probe comprises:

a top surface and a bottom surface;

a measurement point comprising a hole extending from the top surface to the bottom surface, the hole arranged to be connected to an air channel and further to a pressure sensor; and a wall of the measurement probe next to the hole, the wall of the measurement probe extending from the top surface.

2. The measurement probe according to claim 1, wherein the wall of the measurement probe extends parallel to the hole.

3. The measurement probe according to claim 1, wherein the wall is curved around the hole, and the wall is curved with a radius R.

4. The measurement probe according to claim 3, wherein the radius R is 4 to 10 millimeters.

5. The measurement probe according to claim 3, wherein the wall of the measurement probe has a central angle of 45 to 270 degrees.

6. The measurement probe according to claim 3, wherein the wall of the measurement probe has a central angle of 180 degrees.

7. The measurement probe according to claim 1, wherein a height of the wall of the measurement probe is 3 to 15 millimeters from the top surface.

8. The measurement probe according to claim 1, wherein a height of the wall of the measurement probe is 5 to 10 millimeters from the top surface.

9. The measurement probe according to claim 1, further comprising:

a flange part having a perimeter; and an elongated part having a first end and a second end, wherein the flange part is positioned at the first end of the elongated part.

10. The measurement probe according to claim 9, wherein the perimeter has a circular or hexagonal shape.

11. The measurement probe according to claim 9, wherein the wall of the measurement probe comprises an inner surface facing the hole, and the wall comprises an outer surface facing in an opposite direction to the inner surface.

12. The measurement probe according to claim 11, wherein the outer surface of the wall of the measurement probe has a shape that corresponds at least partially to a shape of the perimeter of the flange part.

13. The measurement probe according to claim 9, wherein the flange part has a greater diameter than the elongated part.

14. The measurement probe according to claim 9, wherein the flange part comprises the top surface, and the bottom surface is at the second end of the elongated part.

15. An air pressure measurement system for measuring pressure difference on different sides of an air damper having at least one damper blade, the system comprising:

at least two of the measurement probe according to claim 1 arranged to be fastened on different sides of the air damper so that the wall of each of the at least two of the measurement probe is between a measurement point and the at least one damper blade; and a protruding wall segment that partially surrounds the hole on each side of the damper.

* * * * *